March 17, 1942. W. H. VAN BUREN ET AL 2,276,438
BELT AND METHOD OF TREATING THE SAME
Filed Dec. 14, 1939
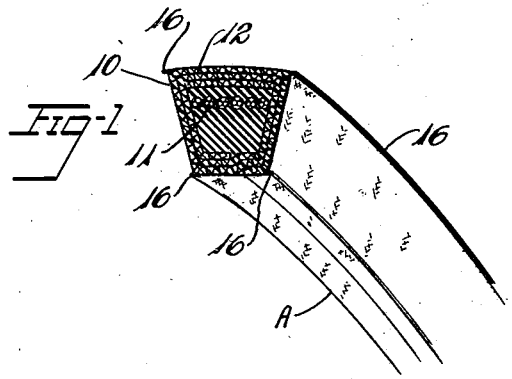
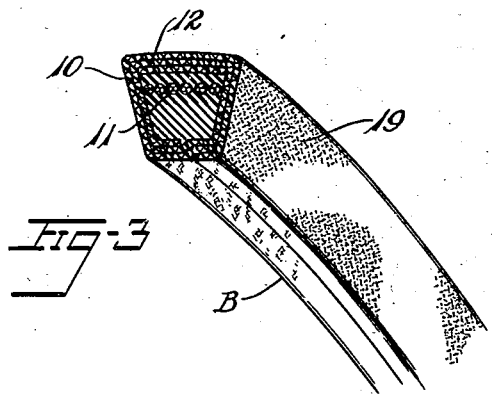
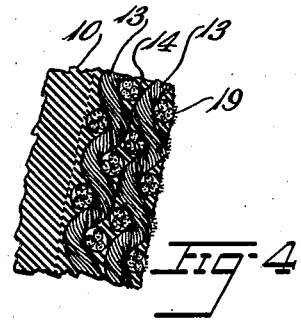
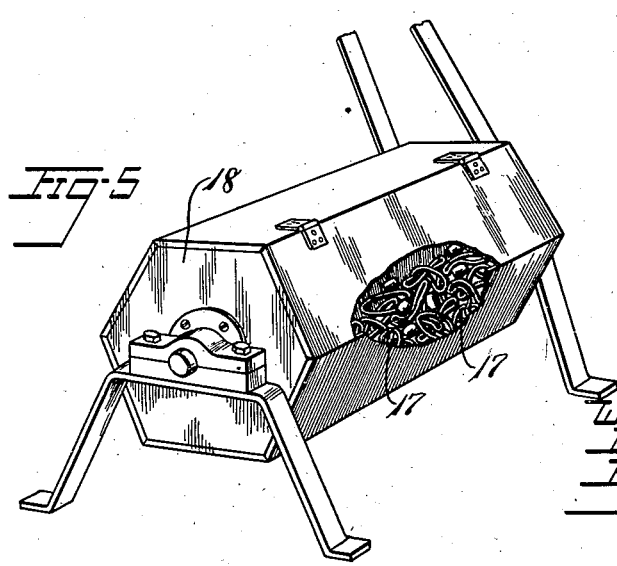
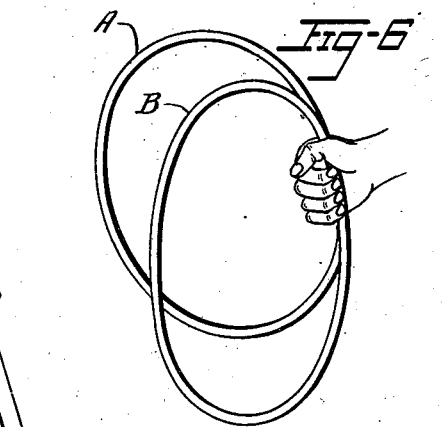
Inventors
Walter H. Van Buren
Paul W. Van Orden
By Willis F. Avery
Atty.

Patented Mar. 17, 1942

2,276,438

UNITED STATES PATENT OFFICE 2,276,438

BELT AND METHOD OF TREATING THE SAME

Walter H. Van Buren, Akron, and Paul W. Van Orden, Cuyahoga Falls, Ohio, assignors to The B. F. Goodrich Company, New York, N. Y., a corporation of New York Application December 14, 1939, Serial No. 309,280

5 Claims. (Cl. 74—233)

This invention relates to belts and the manufacture thereof and especially to V-belts suitable for use on side-driving pulleys and in combined V-pulley and flat pulley assemblies.

Heretofore V-belts molded of rubber and fabric, after a cutting or trimming operation to remove rinds, have forthwith been marketed and put into use. We have found, however, that such belts have a number of objectionable characteristics. The freshly molded belt has possessed a considerable stiffness all through the belt that is possible to reduce, and some portions of the belt have been of greater stiffness than other portions as a result of non-uniform density. The non-uniformity occurs because it is not ordinarily possible to avoid some variations in the distribution of materials and molding pressures along the belt. Also, the splices in the fabric cover have necessarily caused some non-uniformity in the construction. When such belt has been put into use the belt has softened and limbered, but the application of severe force has been sudden, so that strains have been relieved often with a weakening of the belt such that it has not been fit to serve its normal life. Irregularities in stiffness or density also have caused objectionable hopping of the belt on pulleys and other irregular action.

Further, as a result of the molding process the fabric cover of the belt usually has had some crust on its outer surface in the form of rubber particles and oxidized substance resulting from the heat and pressure in contact with the mold, which crust has worn off gradually in service. The wearing off of this crust together with the softening of the belt has resulted in a descent of the belt in the pulley groove, causing a slack in the belt that has often caused objectionable vibration and has required considerable pulley adjustment. As the crust has worn off it has been deposited as dust on nearby objects, which in itself has been objectionable, and in the case of combined V-pulley and flat pulley assemblies the rubber crust has sometimes rolled up between the belt and the flat pulley to cause objectionable squeaking and detraction from smooth operation. Drift of the belt upon flat pulleys and hopping of the belt on idler pulleys often have resulted from this cause, at least to a contributory extent. Further, the crust on the driving surfaces of V-belts has itself contributed to annoying squeaking and has hindered the effective application of anti-squeak materials to the fabric cover of the belts.

The chief objects of this invention are to provide an improved belt wherein the above-discussed and other difficulties are avoided or overcome; to provide for longer belt life, greater power transmission and smoother operation; to provide a belt surface that has better surface contact with the pulley, and that can be more effectively treated with substances for anti-squeaking or for static conduction, or both; to provide for improved anchorage of the fabric cover in the rubber of the belt so that the likelihood of cracking or rupture or loosening of the fabric cover is reduced; to provide for reducing the formation and distribution of dust on and from the belt surfaces, and to provide a uniform surface of the belt free from molding irregularities.

These and further objects will be apparent from the following description, reference being had to the accompanying drawing in which:

Fig. 1 is a perspective view in cross section of a molded V-belt prior to treatment in accordance with the present invention.

Fig. 2 is a cross-section on an enlarged scale at a surface region of the belt of Fig. 1.

Fig. 3 is a view like Fig. 1, but showing the belt after treatment in accordance with the invention.

Fig. 4 is a cross section on an enlarged scale at a surface region of the belt of Fig. 3.

Fig. 5 is a perspective view, with parts broken away and sectioned, of tumbling apparatus useful in the practice of the invention.

Fig. 6 is an elevation of the belts of Figs. 1 and 3 held together in a hand to demonstrate the greater suppleness of the treated belt.

In accordance with the invention we attain the objects hereinabove set forth by subjecting the molded belt to a preliminary working or massage to impart to it greater flexibility, to relieve it of its non-uniform stiff condition and non-uniform internal stresses and to remove from its surface the mold rinds and surface crust that are normally present as a result of the molding operation. The preliminary working to which we subject the belt is far less severe in intensity than the working to which the belt is subjected immediately upon being put in use, and it has the effect among other things of a preliminary limbering exercise to put the belt in better condition to withstand the rigors of normal use. We have found that the threefold purpose of limbering the belt, and removing the undesirable surface substances, as well as improving the condition of the fabric cover, may be effected by working a batch of the molded belts in a tumbling barrel either with or without tumbling blocks to facilitate the treatment.

Referring to the drawing, the belt designated A of Fig. 1, as it comes from the mold comprises a body 10 of rubber composition in which is embedded a layer 11 of tension-resisting cords in its upper region. Surrounding the body is a fabric cover 12, which may be square-woven and bias-laid, is wrapped in a plurality of convolutions, there being two thicknesses of the fabric cover at the side driving faces of the belt in the construction shown and three thicknesses at the inner and outer peripheries of the belt, although the number of cover plies can be varied as desired. The cover preferably is applied during assembly of the belt as rubberized sheet fabric 13. The fabric may be preliminarily rubberized as by a calendering operation, preferably on both sides with a frictioned coat on one side to obtain good penetration into and through the interstices of the fabric. Such rubber is shown at 14. In the molding operation the rubber 14 in the fabric 13 interlocks the fabric and unites it with the rubber 10 of the belt body as a result of the molding heat and pressure. Some of the rubber is disposed at the outer surface of the belt where it becomes a crust 15 (Fig. 2) partially oxidized as a result of direct contact with the heated mold.

It is advantageous to use high molding pressure to obtain greater homogeneity, adhesion of the parts and strength of the belt. In accordance with this invention a high molding pressure may be used, because rubber crust formation on the surface of the belt resulting from the high molding pressure is removed during the preliminary working of the belt after the molding operation. The molded belt ordinarily has molding rinds or fins 16, 16 at the corners thereof as a result of the molding, which rinds require removal before belt is marketed.

For working the molded but untreated belt A of Fig. 1 in accordance with the invention, a batch of the molded belts, indicated at 17, 17 (Fig. 5), are introduced in a suitable working mechanism, which may be a power-driven tumbling barrel 18. Here the belts are tumbled about, agitated, flexed and worked or massaged for a period of time to change their characteristics of flexibility and surface condition, as hereinabove discussed, which change in characteristics may be determined by an occasional inspection and handling of the belts. By the agitation in the tumbling barrel the belts are repeatedly flexed in a gentle manner as compared to the action of normal use on pulleys, and the frictional manipulation of their surfaces or attrition results in the removal from all the belt surfaces of surface crust and rinds which are present on the freshly molded belts. Also, a surface nap 19 (Figs. 3 and 4) is raised on the fabric cover that is exposed, which has the advantage of increasing the friction between the belt surface and the pulley face in use and makes it possible for the belt surface to receive and hold effectively substances that may be applied to the belt surface for increasing friction or eliminating squeaking or conducting static currents.

The improved characteristics of the belt can be detected by handling and visual inspection of the belt. With reference to Fig. 6, when a molded belt A, which is untreated, is held in the hand along side a belt B, which has been treated in accordance with the invention, the greater flexibility of the treated belt is noticeable by its greater suppleness and ability to sag, as shown. As a result of this ability to sag to a greater extent than the relatively stiff untreated belt, the treated belt is better able to assume its proper curvature around belt pulleys immediately when put into use and is not subjected to a sudden and severe breaking-in. This is important especially where the belts are used on pulleys of small diameter. The improved characteristics have been found to result in materially longer life of the belts; they have increased the amount of horse power the belt is able to transmit; they have reduced or eliminated vibration, hopping and other operating difficulties; and they have lessened the necessity for making pulley adjustments to maintain a proper tautness of the belt. In addition, the removal of the surface crust has the advantages of conditioning the belt surface for longer life, and quieter and cleaner operation, as hereinabove discussed.

While the invention is especially useful in the treatment of fabric-covered belts, it is useful also in the treatment of belts without covers on their faces, to obtain the advantages of increased and more uniform flexibility and of crust removal, and in cases where the uncovered belt has fibrous material appearing at the face of the belt, the advantage also of raising surface nap.

Variations may be made without departing from the scope of the invention as it is defined in the following claims:

We claim:

1. The method of treating a molded transmission belt which comprises massaging the molded belt after vulcanization thereof and prior to its normal use on pulleys by subjecting it to a repetition of relatively gentle flexures and frictionally manipulating the surface of the belt to remove surface crust and increase the flexibility of the belt.

2. The method of treating a molded transmission belt of fabric-covered rubber-like material which comprises gently working the surface of the belt after vulcanization thereof and prior to its normal use on pulleys to remove surface crust resulting from the molding operation and to raise a surface nap on the fabric cover.

3. The method of treating a molded V-belt of fabric covered rubber-like material which comprises massaging the molded belt after vulcanization thereof and prior to its normal use on pulleys by subjecting it to a repetition of relatively gentle flexures and frictionally manipulating the surface of the belt to remove surface crust and rind, raise a surface nap on the fabric cover and increase the flexibility of the belts and the uniformity of such flexibility.

4. The method of treating molded transmission belts after vulcanization thereof and prior to their normal use on pulleys which comprises tumbling together a plurality of the molded belts in contact one with another to remove surface crust resulting from the molding operation and to massage the belts to a condition of greater flexibility.

5. The method of treating molded V-belts of fabric-covered rubber-like material after vulcanization thereof and prior to their normal use on pulleys which comprises tumbling together a plurality of the molded belts in contact one with another to remove surface crust, raise a surface nap on the fabric covers, and massage them to a condition of greater flexibility.

WALTER H. VAN BUREN.
PAUL W. VAN ORDEN.